United States Patent [19]

Kalman

[11] 3,940,335

[45] Feb. 24, 1976

[54] FILTERING PROCESS AND APPARATUS

[76] Inventor: Peter Gabor Kalman, 51 Compayne Gardens, London N.W.6, England

[22] Filed: Aug. 17, 1973

[21] Appl. No.: 389,183

[30] Foreign Application Priority Data

Aug. 29, 1972 United Kingdom............... 40064/72
Oct. 10, 1972 United Kingdom............... 46683/72

[52] U.S. Cl. ................. 210/77; 210/179; 210/184; 210/387; 425/197
[51] Int. Cl............................................ B01d 33/00
[58] Field of Search ............ 210/77, 184, 179, 387; 425/197–199

[56] References Cited
UNITED STATES PATENTS

| | | | |
|---|---|---|---|
| 3,471,017 | 10/1969 | Kalman | 210/77 X |
| 3,645,399 | 2/1972 | Kalman | 210/387 X |
| 3,856,680 | 12/1974 | Elmore | 210/184 |

Primary Examiner—Charles N. Hart
Assistant Examiner—Ferris H. Lander
Attorney, Agent, or Firm—Silverman & Cass Ltd.

[57] ABSTRACT

A process and apparatus for filtering substances by introducing a filter band across a passageway through which the substance flows, the filter being passed through inlet and outlet ports sealed to prevent leakage therefrom for example by thermal solidification therein of the substance being filtered or any other suitable sealing substance to form sealing plugs in the ports, and the filter being advanced to locate a fresh part thereof across the passage by supporting the filter upon a reciprocable backing support, moving the backing support in a direction to advance the filter under conditions such that the filter moves with the backing support, and subsequently retracting the backing support under conditions such as to prevent movement of the filter with the backing support.

24 Claims, 16 Drawing Figures

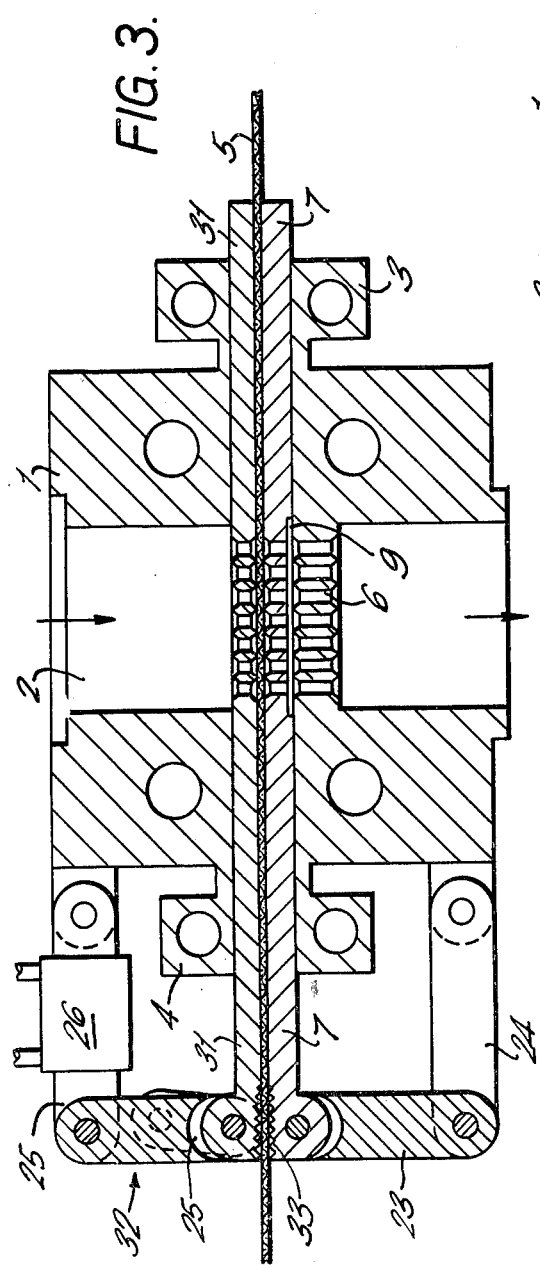
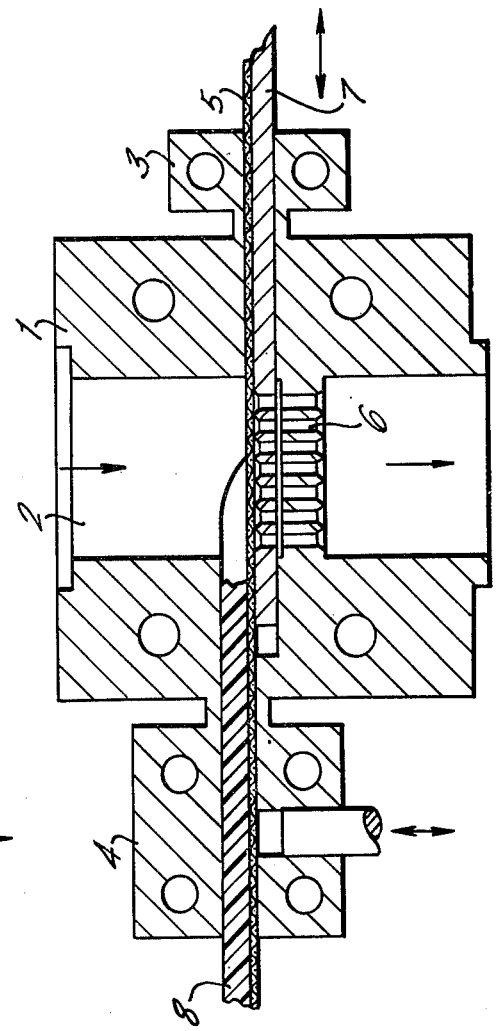

FILTERING PROCESS AND APPARATUS

This invention concerns improvements in or relating to filtering and in particular relates to a filtering device of the type including a body defining a passage through which a substance to be filtered can be caused to flow and slotted inlet and outlet ports flanking said passage through which a filter, in the form of a band or ribbon for example, can be passed and moved to introduce different parts of said filter across said passage, sealing means being provided to prevent or at least limit leakage from said ports. Such a device will hereinafter be referred to as a filtering device "of the kind described".

Whilst, in accordance with the present invention, any convenient means of sealing the inlet and outlet ports can be utilized, a particularly convenient and advantageous sealing means is disclosed in my U.S. Pat. No. 3,471,017, in accordance with which the inlet and outlet ports are adapted for the provision thereat, in use, of such temperature conditions as to result in the formation within said ports of sealing plugs of the substance being filtered of adequate rigidity to prevent substantial leakage of said substance. A similar sealing arrangement as disclosed in my U.S. Pat. No. 3,645,399 could also be utilized for the present invention and comprises forming the abovementioned sealing plugs from a substance other than that being filtered. Whereas the present invention will hereinafter be described with reference to sealing means of the abovementioned thermal type, it is to be appreciated that the invention is not limited thereto and other sealing means could be used.

As has been disclosed in my said U.S. Pat. No. 3,645,399 one of the problems encountered with filtering devices of the type described is that, as the filter becomes progressively clogged with impurities filtered out of the stream of substance, the force which is exerted upon the active part of the filter extending across the passage and which results from the hydrostatic pressure differential across the filter of the substance being filtered can rise to such an extent that in some cases of heavy contamination it is only with some difficulty that the filter can be forwarded. In such cases the filter is often not sufficiently robust to permit the filter merely to be pulled through the device against the retarding forces.

To alleviate the above mentioned problem, it has been proposed in my U.S. Pat. No. 3,645,399 to provide an endless movable backing support mounted within the filtering passage for supporting the filter across the filtering passage and facilitating the filter movement by providing a movable bearing for the filter. It is furthermore proposed to arrange the backing support to move out of the filtering passage through a suitably formed outlet port and then re-enter the filtering passage, after separation from the filter, via a suitably formed re-entry port. By virtue of such an arrangement a two-fold improvement can be obtained: firstly by bringing the backing support out of the filtering passageway it is made accessible to be driven mechanically, and secondly, as fully described in U.S. Pat. No. 3,645,399, it can be arranged that a positive drive obtained from the hydrostatic pressure of the substance being filtered is applied directly to the backing support. Thus this proposal enables the backing support to be driven directly, either mechanically or hydrostatically, and requires no pull to be exerted on the filter itself.

Whereas it is proposed in my U.S. Pat. No. 3,645,399 to make the backing support accessible to be driven by a force sufficiently large to overcome its resistance to movement, it is proposed in my copending U.S. application Ser. No. 344,414 (now U.S. Pat. No. 3,856,674) to reduce to an acceptable level the resistance to movement of the backing support by utilizing a forcewise symmetrical arrangement in which forces applied to the backing support as the result of a hydrostatic pressure differential urging the filter against the backing support are substantially cancelled or at least substantially reduced by oppositely directed forces likewise applied to the backing support for example as the result of a hydrostatic pressure differential across the (or a different) filter.

The present invention provides yet another approach to alleviating the problem of forwarding the filter band or ribbon against the action of substantial retarding forces without subjecting the filter itself to tensions which it is not sufficiently robust to bear. This invention can be utilized alone or, for example, could be utilized in combination with a forcewise symmetrical arrangement as mentioned above.

According to the present invention there is provided a filtering device of the kind described wherein, for moving the filter through the device, there is provided in the filtering passage a backing support for the filter which backing support is arranged for reciprocating movement in the desired direction of movement of the filter and is sufficiently robust to accept and move under the action of forces applied directly thereto to overcome retarding forces encountered in use of the device, and means are provided to prevent movement of the filter with the backing support in one direction of movement thereof but to permit movement of the filter with the backing support in the other direction of movement thereof.

The invention also provides a process for filtering a substance flowing through a passage comprising introducing a filter by passing it through inlet and outlet ports flanking said passage so that a part of the filter extends across said passage, sealing said ports against substantial leakage therethrough of said substance, supporting at least said filter part extending across said passage by means of a filter backing support permeable to flow therethrough of substance filtered by said filter, said filter backing support being reciprocable in the direction of extension of said filter between said ports and across said passage, forcing said substance through said filter to filter the substance, and, when desired, effecting movement of said filter to introduce a fresh part thereof across said passage by moving said backing support in a direction to advance said filter under conditions such that the filter moves with the backing support, and subsequently retracting said backing support under conditions such as to prevent movement of the filter with the backing support.

For forwarding movement of the filter which is accomplished during the forward stroke of the reciprocating backing support, it may be sufficient to rely upon the friction between the filter and the backing support due to the hydrostatic pressure in the filtering passageway forcing the filter against the backing support to ensure that the filter moves with the backing support. Alternatively, clamping means may be provided arranged to be alternately operative and inoperative in synchronisation with the forward and retract strokes of the reciprocating backing support, the clamping means in its operative condition being adapted to ensure movement of the filter with the backing support.

For preventing movement of the filter with the reciprocating backing support in its retract stroke, various arrangements may be employed, either singly or in combination depending upon the circumstances and the magnitudes of the forces involved.

In the abovementioned arrangements as disclosed and claimed inter alia in my U.S. Pat. No. 3,471,017 wherein the sealing of the inlet and outlet ports is achieved by means of solidified sealing plugs formed therein, it is possible by dimensioning the outlet port cross-section larger than that of the inlet port to obtain a resultant hydrostatic force tending to extrude the sealing plug in the outlet port and, by virtue of the keying of the filter to the sealing plugs, this resultant hydrostatic force contributes a forwarding drive to the filter itself. Whilst this hydrostatic forwarding drive may in itself be insufficient to move the filter against its retarding froces, it can be arranged to be sufficient to enable the reciprocating backing support to be retracted without drawing the filter with it.

Another possibility is to employ clamping means operative during the retract stroke of the backing support and otherwise inoperative. The clamping means may take any convenient form, but a particularly convenient arrangement is to employ the aforementioned thermally-derived sealing plugs for sealing the inlet and outlet ports and to arrange the clamping means to clamp upon the sealing plug in or extending from the outlet port.

In accordance with yet a further possibility, means may be provided operable during the retract stroke of the backing support to relieve the backing support from the application thereto of forces exerted upon the filter as the result of the hydrostatic pressure differential thereacross. For example, an auxiliary backing support may be movable through slotted openings in the reciprocating backing support in a direction transverse to the reciprocation thereof so as to lift the filter off the backing support, or at least relieve the pressure it exerts thereupon, during the backing support retract stroke. During the forward stroke of the reciprocating backing support, the auxiliary backing support would be retracted.

Preferred embodiments of the invention disclosed herein merely by way of example will now be described with reference to the accompanying drawings in which:

FIG. 3 is a sectional view of a third embodiment employing a cover plate for the filter;

FIG. 4A is a sectional view of a fourth embodiment employing a hydraulic clamp;

Figure 6:
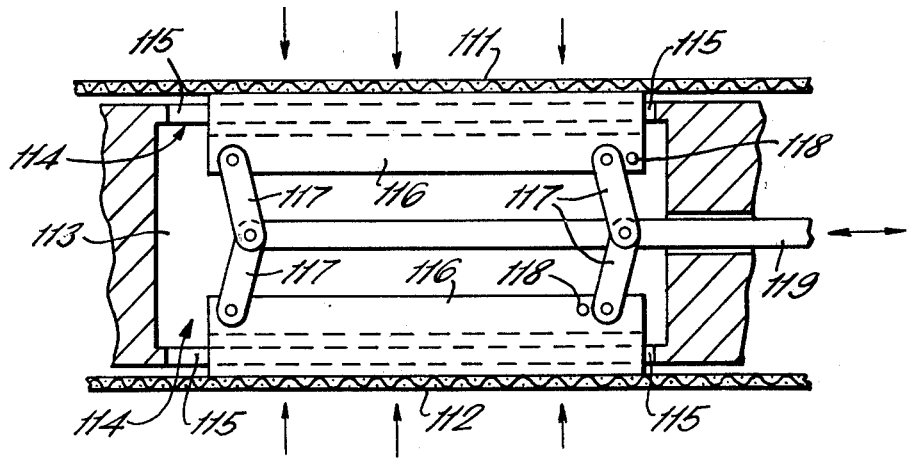

FIG. 6 is a schematic view of a sixth embodiment employing the forcewise symmetrical arrangement of my U.S. Pat. No. 3,856,674

Figure 10:
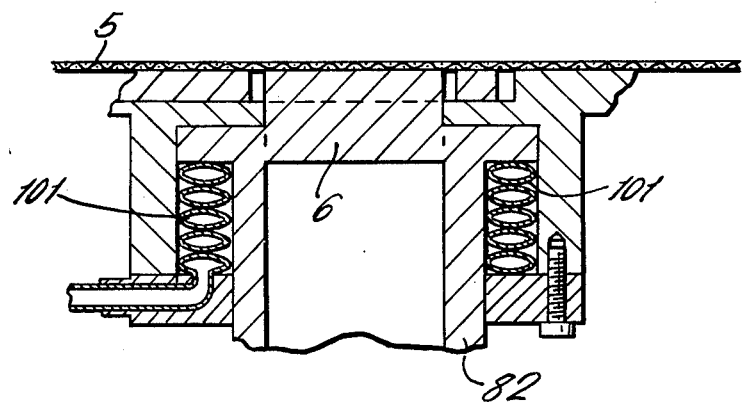
Figure 7:
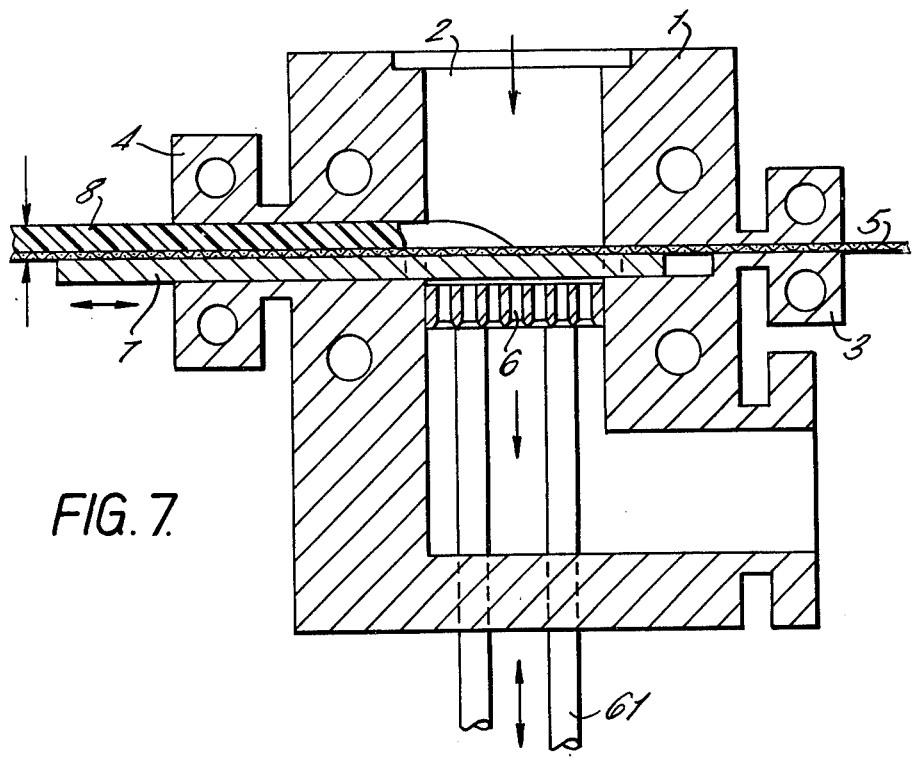
Figure 8A:
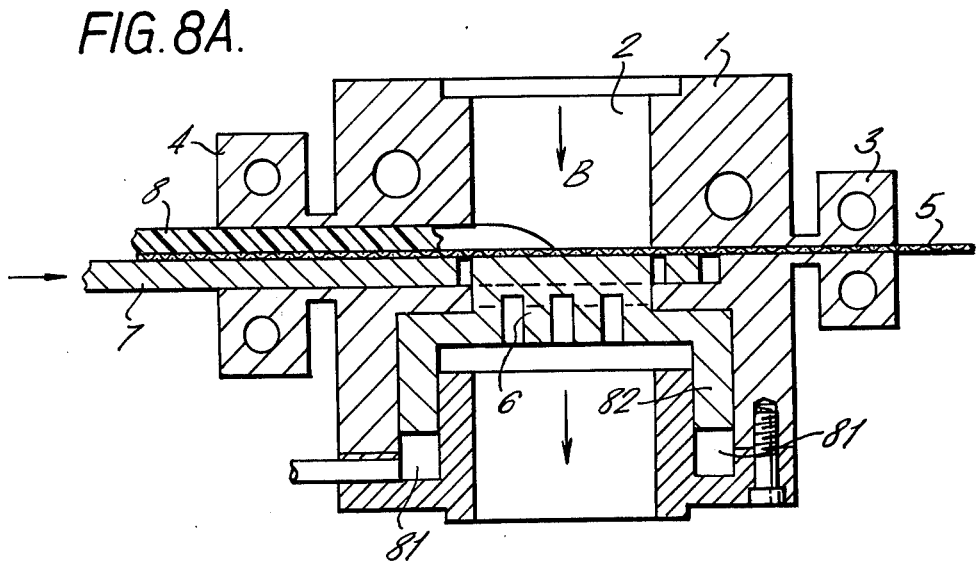
Figure 8B:
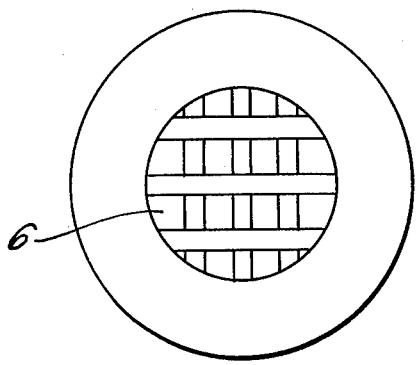
Figure 8C:
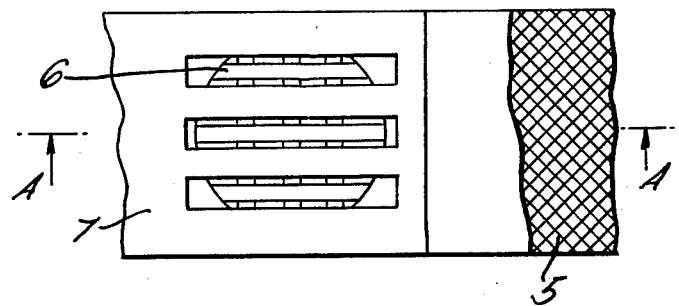
Figure 9:
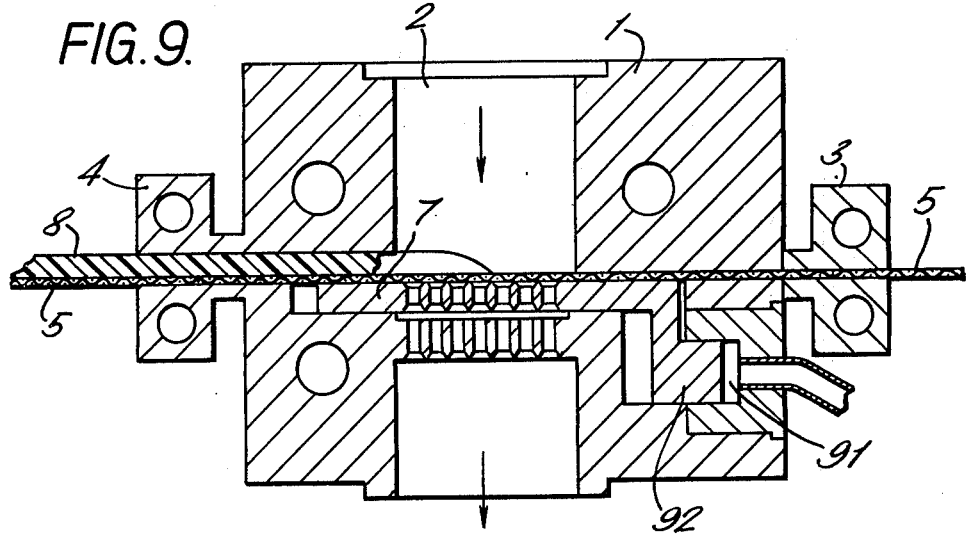

FIG. 7 is a sectional view of a seventh embodiment employing a reciprocating breaker plate actuated by push rods;

FIG. 8A is a sectional view of an eighth embodiment employing a reciprocating breaker plate actuated hydraulically;

FIG. 8B is a partly broken away view in the direction of arrow B of FIG. 8A of a filter and backing support;

FIG. 8C is a view along arrow B of FIG. 8A showing part of the backing support;

FIG. 9 is a sectional view of a ninth embodiment having a hydraulically actuated backing support; and FIG. 10 is a sectional partly broken away view of a modified hydraulic system for use in either the eighth or ninth embodiments.

Figure 1:
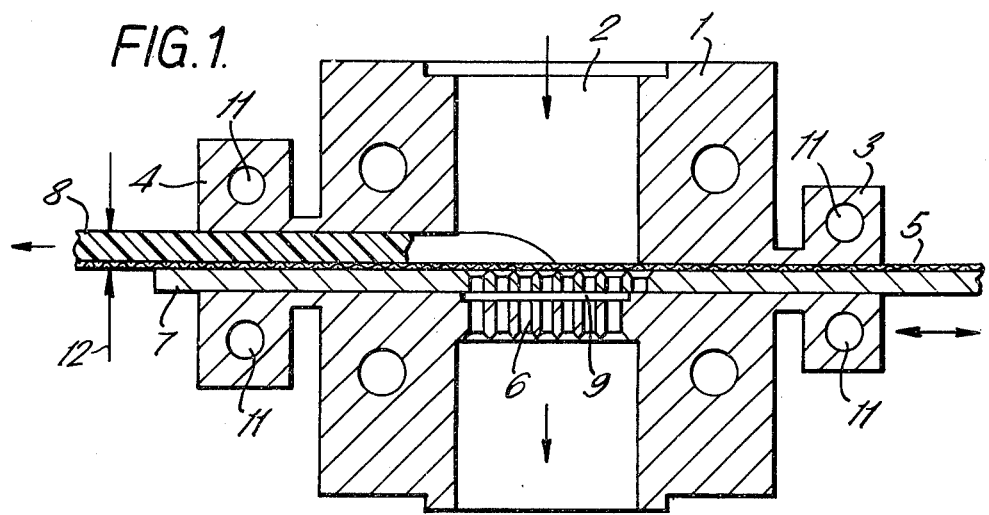
FIG. 1 is a sectional view of a first embodiement in which backward movement of the filter is prevented by provision of means for clamping a thermally formed solid sealing plug strongly keyed with the filter at the filter exit port.

Referring to FIG. 1, a filtering device according to the invention includes a body 1 defining a passage 2 for a substance to be filtered, and slotted inlet and outlet ports 3 and 4 flanking the passage through which a filter band 5 can be moved. The filter band may for example comprise one or more woven steel screens or sintered metal filtering media; or screens embracing a matrix of random fibres such as glass or metal fibres. The filter is supported by a breaker plate 6 having shallow surface channels 9 communicating with through perforations 10 and by a reciprocable backing support 7 having through perforations where it overlies the breaker plate 6. The channels 9 of the breaker plate 7 allow the filtrate to flow through even when the perforations of plate 6 and support 7 are out of register. These channels 9 could equally well be provided in the undersurface of support 7. The support 7 protrudes from both ports 3 and 4 and is reciprocated by drive means not shown (such as a hydraulic or pneumatic cylinder) which may be coupled to the backing support at the inlet or at the outlet side of the apparatus.

Reciprocable backing support 7 is made sufficiently strong and rigid to accept the forwarding force required to advance the filter 5 across the filtering passage 2, the forwarding force being transferred to the filter 5 by virtue of the pressure of the substance being filtered forcing filter 5 against support 7.

Inlet and outlet ports 3 and 4 are sealed in operation in the manner disclosed in U.S. Pat. No. 3,471,017 by controlling the temperature of the ports, for example by passing a suitable coolant through channels 11, so that the substance being filtered solidifies in the ports to form sealing plugs such as 8 of sufficient rigidity to prevent substantial leakage therethrough. By making the passage within outlet port 4 of greater cross-section than the corresponding passage of inlet port 3, the hydrostatic pressure of the substance being filtered acting upon the sealing plugs in the inlet and outlet ports produces a net force tending to extrude the outlet port sealing plug and, by virtue of the filter 5 being strongly keyed to the sealing plugs, providing a forwarding drive to the filter. This force itself can be sufficient to prevent the filter moving back with support 7. Alternatively or additionally, for preventing the filter 5 from moving with the retract stroke of reciprocating support 7, means (schematically illustrated at 12) can be provided to clamp the filter and the solidified sealing plug 8 for example at the exit port 4 during retraction of support 7.

Figure 2B:
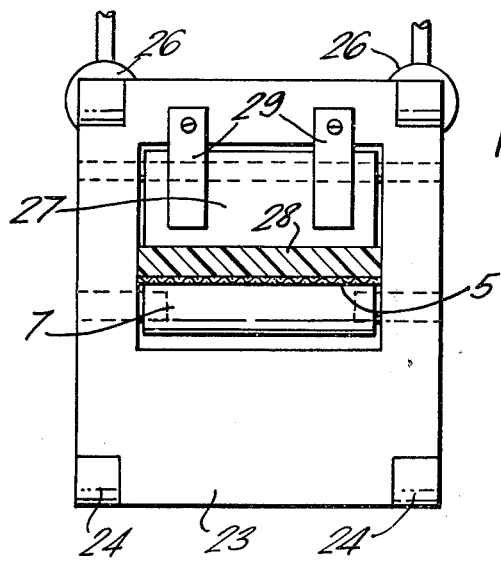
FIG. 2B is a view along the line B—B of FIG. 2A.
Figure 2C:
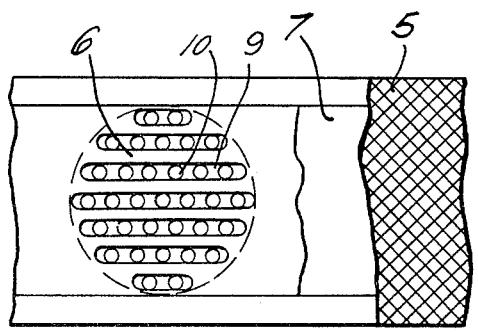
FIG. 2C is a partly broken away view along the line C—C of FIG. 2A of a filter and backing support.
Figure 2A:
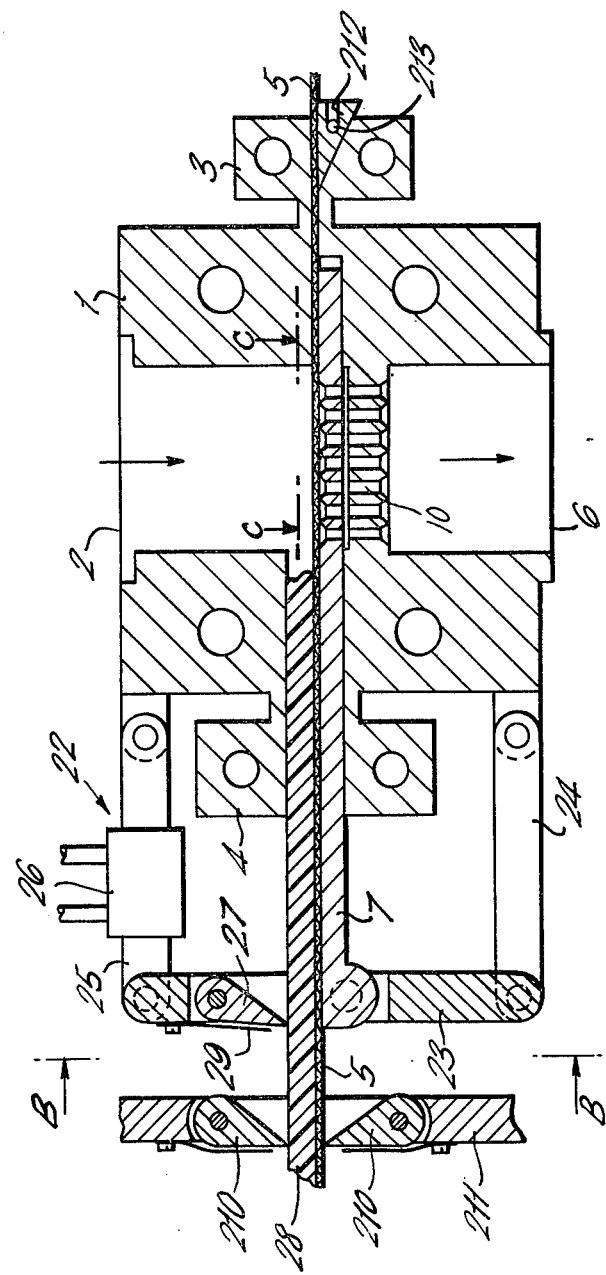
FIG. 2A is a sectional view of a second embodiment employing a toggle mechanism for preventing backward movement of the filter.

In FIGS. 2A, 2B and 2C, and all subsequent figures, parts of the filtering devices shown therein which are similar or perform similar functions to parts shown in FIG. 1 are denoted by the same reference numerals.

The embodiment of FIG. 2 is similar in many respects to that of FIG. 1 but has backing support 7 accessible only from the exit port side of the apparatus. A toggle mechanism 22 is provided for reciprocating the backing support 7 to advance the filter 5 across the passage 2, this mechanism being in itself similar to that disclosed in my U.S. Pat. No. 3,471,017. Toggle mechanism 22 comprises a frame 23 pivotally connected (a) via linkages 24 to body 1; (b) to backing support 7; and (c) via linkages 25 to hydraulic cylinders 26. A toggle jaw 27 is provided to engage the solidified plug 28 at the exit of the outlet port 4 and is biased towards the plug by leaf spring 29. Movement prevention means in the form of similarly biassed toggle jaws 210 are carried on a frame 211 affixed to body 1 so as to prevent filter 5 and plug 28 from sliding back into body 1 when backing plate 7 is retracted. In operation, actuation of cylinders 26 causes the toggle mechanism 22 to reciprocate with consequent reciprocation of backing support 7. During forward movement, toggle jaw 27 clamps the filter 5 and outlet port sealing plug 28 to backing support 7, so that they move together to forward the filter 5 across the filtering passage 2. During backward movement of the toggle mechanism, toggle jaw 27 rides over outlet port sealing plug 28, but toggle jaws 210 hold the plug and filter stationary.

The inlet port 3 is provided with an adjustable wedge member 212 as disclosed in my U.S. Pat. No. 3,471,017 wedge 211 being independently cooled by means of coolant channel 213.

In the embodiment of FIG. 3, backing support 7 has surface channels 9 similar to those of the breaker plate 6 of FIG. 1. A cover plate having perforations as shown is furthermore provided for protecting the filter (which may comprise up to 1,500 fine wires per linear inch and hence is open to damage during its passage through the device) without necessarily incurring the requirement of an expensive protective upper layer. An hydraulically operated toggle mechanism 32, generally similar to that shown in FIG. 2, is employed for forwarding the filter, backing support 7 and cover plate 31 being pivotally connected to the toggle mechanism. Support 7 and cover plate 31 are serrated in the vicinity of toggle mechanism 32 for gripping filter 5 disposed between them. In operation, as the hydraulic cylinders 26 expand and force the toggle frame outwards, the frictional drag acting on the cover plate rotates the toggle link counterclockwise, slightly bends cover plate 31 and causes the jaws formed by the serrations to grip the filter tightly and pull it forward. During the return phase, the frictional resistance turns the link slightly clockwise, the thin cover plate 31 bending elastically so that the jaws open as the two plates return. A non-return toggle arrangement, similar to that shown at the lefthand side of FIG. 2A and supported on body 1, may be provided so as to prevent backward movement of the filter during the return stroke.

The toggle mechanism may be disposed as shown at the exit port or alternatively could be disposed at the inlet port. Also, the support 7 and cover plate 31 need not extend across the breaker plate 6, although it is advantageous that they do.

Under conditions where the substance being filtered is heavily contaminated, an alternative cover plate 31 preferably is used which is slotted longitudinally with cross-sectionally V-shaped slots closely adjacent one another so that the plate 31 presents to the flow of substance being filtered a surface made up of a plurality of spaced parallel lines as opposed to the area surface presented by the cover plate 31 shown in FIG. 3.

Figure 4B:
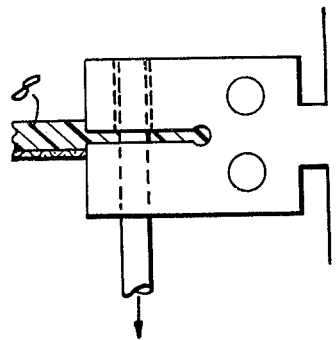
FIGS. 4B and 4C show, diagramatically, modified filter clamping means of the fourth embodiment.
Figure 4C:
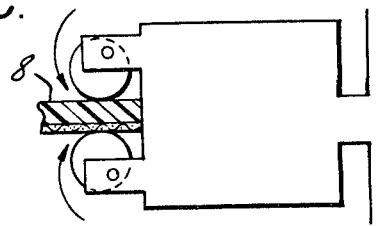

In FIG. 4A, backing support 7 does not extend through the outlet port and a reciprocating force is applied to it at the inlet. The filter may be clamped at the exit port during retraction of the backing support by means of a hydraulic or pneumatic cylinder, as shown in FIG. 4A; or as shown in FIG. 4B by a slit exit flange which can be made to grip the sealing plug at the exit together with the filter by pulling or pushing the slit halves together; or as shown in FIG. 4C by means of spring loaded eccentric grippers disposed on the exit port or some other stationary support.

Figure 5:
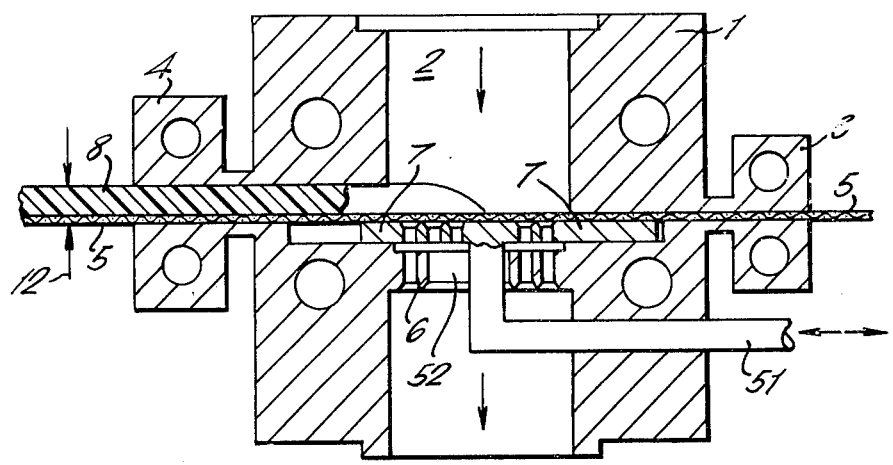
FIG. 5 is a sectional view of a fifth embodiement employing a push rod for reciprocating a wholly contained backing plate.

In FIG. 5, the backing support 4 does not extend either through the inlet or outlet ports but is wholly enclosed within the body 1. A push rod 51 making a sliding fit within the body extends into passage 2 and is coupled to backing support 7. Breaker plate 6 is slotted at 52 to allow the push rod to be receiprocated.

FIG. 6 shows schematically an arrangement of the forcewise symmetrical type generally forming the subject of my U.S. Pat. No. 3,856,674 adapted for reciprocatory movement in accordance with this invention. The drawing shows the interior of a filtering device wherein two filter bands 111 and 112 are simultaneously subject to substance to be filtered flowing in a filtering passageway which supplies substance to the two filters at substantially equal pressures and communicates with the space 113 for the extraction of filtered substance therefrom. Access of filtered substance to the space 113 is gained by way of openings 114 incorporating spaced parallel slats 115 which serve as breaker plates in the manner of the breaker plates 6 of the preceding embodiments herein described, and associated with each such "breaker plate" there is a filter support structure 116 formed with grooves defining therebetween raised parallel lands which interdigitate loosely with the slots in the "breaker plates". The two filter support structures 116 are supported and interconnected by means of a plurality of pivotal links 117 the extent of movement of which is limited by means of stops 118. A coupling rod 119 is pivotally connected to the links 117 and extends through a wall of the device to be reciprocated by any suitable means.

In operation of the device of FIG. 6, the filter support structures 116 normally lie with their support surfaces flush with the level of the slots 115; a movement of the coupling rod 119 from right to left as shown in the Figure does not initially move the support structures 116 in the direction of movement of the coupling rod 119 since the support structures 116 are frictionally engaged with the filters 111 and 112 but instead causes the links 117 to pivot about their connections with the coupling rod 119 in a sense to cause the support structures 116 to move outwardly and take the load of the filters 111 and 112 hitherto borne by the slats 115. The extent of the outward movement of support structures 116 is determined by one of the stops 118. Further movement of the coupling rod 119 in this direction will tend to move the support structures 116 from right to left and can be arranged to cause movement of the filters 111 and 112 for advancing them across the filtering passage. Return movement of the coupling rod 119 from its extreme left hand position in a left to right direction causes the links 117 initially to pivot in a sense to cause the support structures 116 to move inwards thereby releasing the loading imposed by the filters 111 and 112 which are taken up by the "breaker plates", and thereafter results in the support structures 116 being moved bodily to their right hand limiting positions. Thus by reciprocation of the coupling rod 119, the support structures repeatedly lift the filters from their respective support structure, advance them across the filtering passage, lower them again on to their respective "breaker plate", and then return for the next stroke.

In FIG. 7, an alternative method is shown of preventing backward movement of the filter 5 together with the backing support 7. Backing support 7 and breaker plate 6 are slotted and interleaved, and plate 6 is arranged to be reciprocated by means of push rods 61 through a small distance transversely to the backing support 7. The movement of plate 6 is coordinated with the movement of support 7 so that whilst support 7 moves forward, plate 6 is retracted from filter 5 so that the filter is pressed against the support by the hydrostatic pressure differential existing across it whereby filter 5 is forwarded together with support 7. Preceding retraction of support 7, plate 6 is moved towards and engages the filter so that it bears at least a substantial part of the hydrostatic pressure differential thus largely disengaging support 7 from the filter so that the filter does not move backward with the support. Hence when support 7 is retracted, it is substantially free of the load due to the contaminants collected on the filter. Movements of breaker plate 6 transversely to the filter 5 are small so that there is no tendency for the filter 5 which, as shown in FIG. 2C, is broader than the diameter of the filtering passage at the breaker plate 6, to be deformed to such an extent as to uncover part of the filtering passage and thereby provide an unfiltered flow path through the device.

In the embodiment shown in FIGS. 8A to 8C which is similar in principle to that of FIG. 7 the breaker plate 6 is reciprocated transversely to the filter by means of an annular hydraulic piston and cylinder arrangement 81, 82 disposed within the body 1, the annular piston 82 being integral with breaker plate 6 which as shown in FIG. 8C is a cross-slotted structure of the type disclosed in my U.S. Pat. No. 3,471,017. Breaker plate 6 is interleaved with a slotted backing support 7 as shown in FIG. 8B. The mode of operation of this embodiment is similar to that of FIG. 7, i.e. the breaker plate 6 is lowered for forwarding movement of the filter with the advance stroke of backing support 7, and is raised to relieve backing support 7 of the pressure of the filters 5 during the retract stroke of the backing support.

FIG. 9 shows a filtering device in which the backing support 7 is reciprocated by suitable operation of an hydraulic cylinder 91 disposed at least partly within body 1; the piston 92 of the cylinder is integral with backing support 7. In this embodiment breaker plate 6 is stationary, and the hydrostatic force acting on sealing plug 8 prevents backward movement of filter 5. Alternatively grippers, such as for example those shown in FIG. 2, may be provided in the region of the outlet and/or the inlet port.

In the arrangements of, for example, FIGS. 5, 6 and 9 wherein the backing support is wholly contained within the body of the device, or FIGS. 2, 4, 7 and 8 wherein the backing support passes with the filter through one only of the two ports, particularly the outlet port, it could be arranged that, in order to facilitate passage of the filter through any port not traversed by the filter backing support, particularly the inlet port, an auxiliary filter carrier supports and preferably sandwiches the filter band in the respective port, the auxiliary filter carrier being constructed for example similarly to the gripper mechanism of FIG. 3 so as to be reciprocable by application of forces thereto for advancing the filter on its forward stroke and retracting without retracting the filter. Such an arrangement could, if desired, also be employed in conjunction with any of the arrangements of my U.S. Pat. Nos. 3,471,017, 3,645,399 or 3,856,674 facilitating introduction of the filter into the inlet port or for facilitating extraction of the filter from the outlet port. It will furthermore be recognised that the arrangement for example of FIG. 1 could be operated with the backing support moved unidirectionally; such a process is embraced by my U.S. Pat. No. 3,471,017.

FIG. 10 shows a modification of the hydraulic system employed in the embodiment of FIGS. 8A to 8C in which the annular cylinder is sealed, not by an accurate fit of the mating components, but by a coiled tube 101 of fluorosilicone rubber (e.g. Siliastic rubber made by the Dow Corning Co.) contained within the annular chamber and inflated when desired from outside body 1. Clearly the embodiment shown in FIG. 9 could be similarly modified without difficulty.

While all the embodiments described employ breaker plates for providing additional support for the filter, it will be realised that in the embodiment of FIGS. 1 to 5 and 9 the breaker plate may be omitted if the backing support is made sufficiently strong. Other modifications are possible within the scope of the invention; for example the backing support may be coated with PTFE to facilitate the parting off of the filter and of the solidified plug from the backing support at the exit port. While the reciprocating backing support has been shown herein as a plate or band, it could be formed as an articulated structure or as a drum as shown in my U.S. Pat. No. 3,645,399.

What I claim is:

1. A process for filtering a substance flowing through a passage comprising introducing a filter by passing it through inlet and outlet ports flanking said passage so that a part of the filter extends across said passage, sealing said ports against substantial leakage therethrough of said substance, supporting at least said filter part extending across said passage by means of a filter backing support permeable to flow therethrough of substance filtered by said filter, said filter backing support being reciprocable in the direction of extension of said filter between said ports and across said passage, forcing said substance through said filter to filter the substance, and, when desired, effecting movement of said filter to introduce a fresh part thereof across said passage by moving said backing support in a direction to advance said filter under conditions such that the filter moves with the backing support, and subsequently retracting said backing support under conditions such as to prevent movement of the filter with the backing support.

2. A process as claimed in claim 1 wherein said ports are sealed by the provision thereat of such temperature conditions as to result in the formation therein of sealing plugs, of the substance being filtered or of another flowable sealing substance, of adequate rigidity to prevent substantial leakage from said ports.

3. A process as claimed in claim 2 wherein the movement of said filter is effected under conditions providing for self-maintenance of said sealing plugs.

4. A process as claimed in claim 2 wherein the filter is keyed to the sealing plug within the outlet port and wherein the hydrostatic pressure of said substance within said passage acting on said sealing plug within the outlet port is utilized to prevent said filter from moving with the backing support during retraction thereof.

5. A process as claimed in claim 2 wherein the filter is keyed to the sealing plug within the outlet port, and the outlet port sealing plug is secured against movement with the backing support during retraction thereof to prevent movement of the filter with the backing support during retraction thereof.

6. A process as claimed in claim 1 wherein, for preventing movement of the filter with the backing support during retraction thereof, the loading of the backing support by the filter is reduced for retraction thereof by temporarily supporting the filter other than exclusively by means of the backing support.

7. A filtering device, including; a body defining a passage through which a substance to be filtered can be caused to flow and inlet and outlet ports through which a filter can be passed and moved to advance said filter and introduce different parts thereof across said passage, sealing means being provided to limit leakage from said ports; a backing support, permeable to flow therethrough of substance filtered by said filter, extending across said passage for supporting said filter thereacross, said backing support being arranged for reciprocating movement in the desired direction of movement of the filter and being sufficiently robust to accept, and move under the action of, forces applied directly thereto to overcome retarding forces encountered in use of the device; and means to prevent movement of the filter with the backing support in one direction of movement thereof, but to permit movement of the filter with the backing support in the other direction of movement thereof for advancing the filter.

8. A filtering device as claimed in claim 7 wherein said sealing means is constituted by said ports being adapted for the provision thereat, in use, of such temperature conditions as to result in the formation within said ports of sealing plugs, of the substance being filtered or of another flowable sealing substance, of adequate rigidity to prevent substantial leakage from said ports.

9. A filtering device as claimed in claim 8 wherein the cross-section of said outlet port is greater than that of said inlet port whereby, in use, the hydrostatic pressure of said substance being filtered exerts a greater force upon the outlet port sealing plug than upon the inlet port sealing plug thereby, by virtue of the sealing plugs being keyed with the filter in use of the device, providing a net force tending to advance the filter, and said net force serves, at least in part, to prevent said movement of said filter with said backing support in said one direction.

10. A filtering device as claimed in claim 7, including clamping means operative during movement of the backing support in said one direction and otherwise inoperative, said clamping means being operative to prevent movement of the filter with the backing support during movement thereof in said one direction.

11. A filtering device as claimed in claim 8 wherein said clamping means is arranged to clamp upon the outlet port sealing plug.

12. A filtering device as claimed in claim 7 including means operative during movement of the backing support in said one direction to relieve the backing support from the application thereto of forces exerted on the filter as the result of the hydrostatic pressure differential thereacross in use, thereby to enable movement of the backing support in said one direction without consequential movement of the filter therewith.

13. A filtering device as claimed in claim 12 including means movable through openings in the backing support in a direction transverse to the direction of reciprocation thereof so as to bear upon the filter and at least relieve the pressure exerted upon the backing support by the filter, during movement of the backing support in said one direction.

14. A filtering device as claimed in claim 7 wherein said backing support is arranged to be movable also in a direction transverse to the direction of reciprocation thereof between a position where the backing support carries the filter for advancement thereof during movement of the backing support in said other direction and a position where the backing support is substantially disengaged from the filter so as to be movable in said one direction without movement of the filter, means being provided to support the filter when the backing support is disengaged therefrom.

15. A filtering device as claimed in claim 7 including means to ensure movement of said filter with said backing support during movement thereof in said other direction.

16. A filtering device as claimed in claim 7 constructed as a forcewise symmetrical arrangement in which forces applied to the backing support as the result of a hydrostatic pressure differential urging the filter against the backing support are at least substantially reduced by oppositely directed forces likewise applied to the backing support as the result of a hydrostatic pressure differential across the (or a different) filter.

17. A filtering device including a body defining a passage through which a substance to be filtered can be caused to flow and inlet and outlet ports through which a filter in the form of a band is passed and can be moved to advance the filter and introduce a different part thereof across said passage, said ports being adapted for the provision thereat of such temperature conditions as to enable the formation therein of sealing plugs of a flowable sealing substance of adequate rigidity to prevent substantial leakage from said ports, means to provide temperature conditions at said ports to form said sealing plugs, a filter carrier extending into at least one of said ports from outside the body of the device, means for reciprocating said filter carrier in the direction of said filter passing through said at least one port, and means to ensure movement of the filter with the filter carrier in one direction of said reciprocating movement of the filter carrier for advancing the filter, but to prevent movement of the filter with the filter carrier in the other direction of movement thereof.

18. A process as claimed in claim 2 wherein, for preventing movement of the filter with the backing support during retraction thereof, the loading of the backing support by the filter is reduced for retraction thereof by temporarily supporting the filter other than exclusively by means of the backing support.

19. A process as claimed in claim 3 wherein, for preventing movement of the filter with the backing support during retraction thereof, the loading of the backing support by the filter is reduced for retraction thereof by temporarily supporting the filter other than exclusively by means of the backing support.

20. A process as claimed in claim 4 wherein, for preventing movement of the filter with the backing support during retraction thereof, the loading of the backing support by the filter is reduced for retraction thereof by temporarily supporting the filter other than exclusively by means of the backing support.

21. A filtering device as claimed in claim 8 including clamping means operative during movement of the backing support in said one direction and otherwise inoperative, said clamping means being operative to prevent movement of the filter with the backing support during movement thereof in said one direction.

22. A filtering device as claimed in claim 9 including clamping means operative during movement of the backing support in said one direction and otherwise inoperative, said clamping means being operative to prevent movement of the filter with the backing support during movement thereof in said one direction.

23. A filtering device as claimed in claim 9 wherein said clamping means is arranged to clamp upon the outlet port sealing plug.

24. A filtering device as claimed in claim 10 wherein said clamping means is arranged to clamp upon the outlet port sealing plug.

* * * * *